United States Patent [19]

Zigler et al.

[11] Patent Number: 5,175,461
[45] Date of Patent: Dec. 29, 1992

[54] PERMANENT MAGNET ROTOR HAVING MAGNET POSITIONING AND RETAINING MEANS

[75] Inventors: Robert V. Zigler; William H. Stark, both of Fort Wayne, Ind.

[73] Assignee: General Electric Company, Fort Wayne, Ind.

[21] Appl. No.: 474,436

[22] Filed: Feb. 2, 1990

Related U.S. Application Data

[63] Continuation-in-part of Ser. No. 459,633, Jan. 2, 1990, Pat. No. 5,040,286, which is a continuation-in-part of Ser. No. 203,942, Jun. 8, 1988, abandoned.

[51] Int. Cl.⁵ .............. H02K 21.14; H02K 21/12; H02K 1/27
[52] U.S. Cl. ..................... 310/156; 310/262
[58] Field of Search ............. 310/42, 156, 261, 262, 310/265, 43; 29/598, 596

[56] References Cited

U.S. PATENT DOCUMENTS

| | | | |
|---|---|---|---|
| 3,531,670 | 9/1970 | Loudon | 310/156 |
| 4,126,933 | 11/1978 | Anderson et al. | 310/156 |
| 4,327,479 | 5/1982 | Futterer | 29/596 |
| 4,433,261 | 2/1984 | Nashiki et al. | 310/156 |
| 4,503,368 | 3/1985 | Sakamoto | 310/156 |
| 4,586,244 | 5/1986 | Muller | 29/598 |
| 4,587,721 | 5/1986 | Muller | 29/598 |
| 4,631,435 | 12/1986 | McCarty | 310/156 |
| 4,678,954 | 7/1987 | Takeda et al. | 310/156 |
| 4,742,259 | 5/1988 | Schaefer et al. | 310/156 |
| 4,746,827 | 5/1988 | Ochiai et al. | 310/156 |
| 4,801,834 | 1/1989 | Stokes | 310/156 |
| 4,850,100 | 7/1989 | Stokes | 310/156 |
| 4,877,986 | 10/1989 | Shimizu | 310/156 |
| 4,910,861 | 3/1990 | Dohogne | 310/156 |
| 4,954,736 | 9/1990 | Kawamoto et al. | 310/156 |
| 4,973,872 | 11/1990 | Dohogne | 310/156 |

FOREIGN PATENT DOCUMENTS

| | | | |
|---|---|---|---|
| 0143693 | 6/1985 | European Pat. Off. | 310/261 |
| 0064556 | 3/1988 | Japan | 310/156 |
| 0265554 | 11/1988 | Japan | 310/156 |
| 0081634 | 3/1989 | Japan | 310/261 |

Primary Examiner—Steven L. Stephan
Assistant Examiner—C. La Balle
Attorney, Agent, or Firm—Ralph E. Krisher, Jr.

[57] ABSTRACT

A permanent magnet rotor includes a rotor core having an axis of rotation and longitudinally extending radially projecting ribs. A plurality of arcuate magnetic elements are retained against an outer surface of the rotor by a cylindrical shell such that each magnet is disposed between a pair of the ribs. A hardenable adhesive is interposed between the outer surface of the core and the magnets and cooperates with the ribs and magnets to prevent rotational slippage of the magnets relative to the core during rotation of the rotor. Various embodiments utilize different techniques for retaining the components in assembled relation.

37 Claims, 4 Drawing Sheets

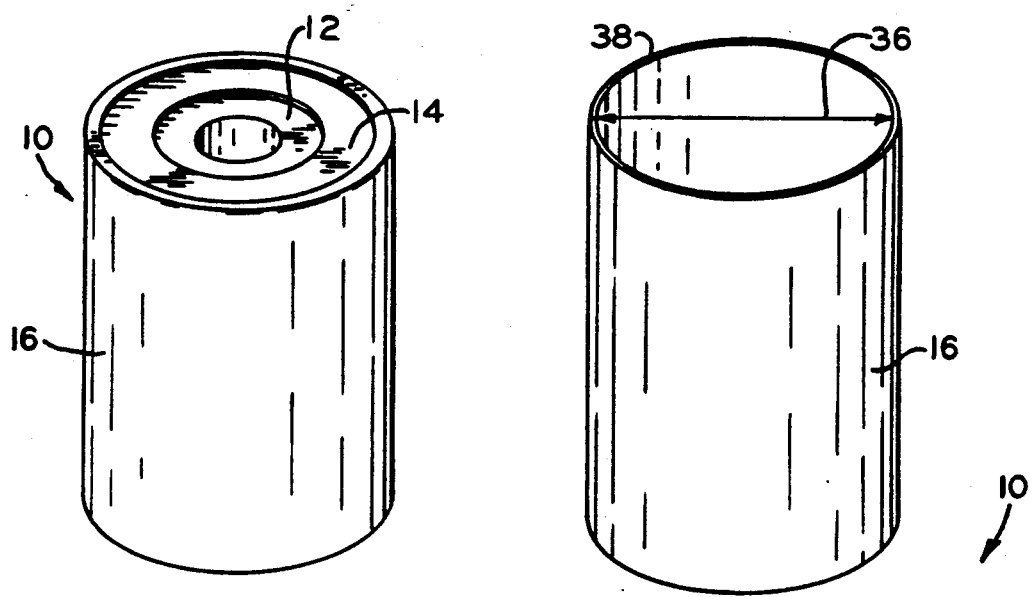
FIG_1
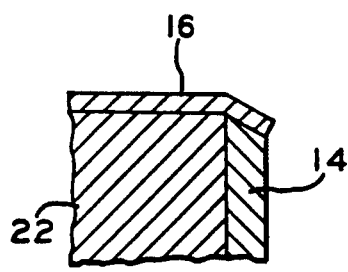
FIG_10
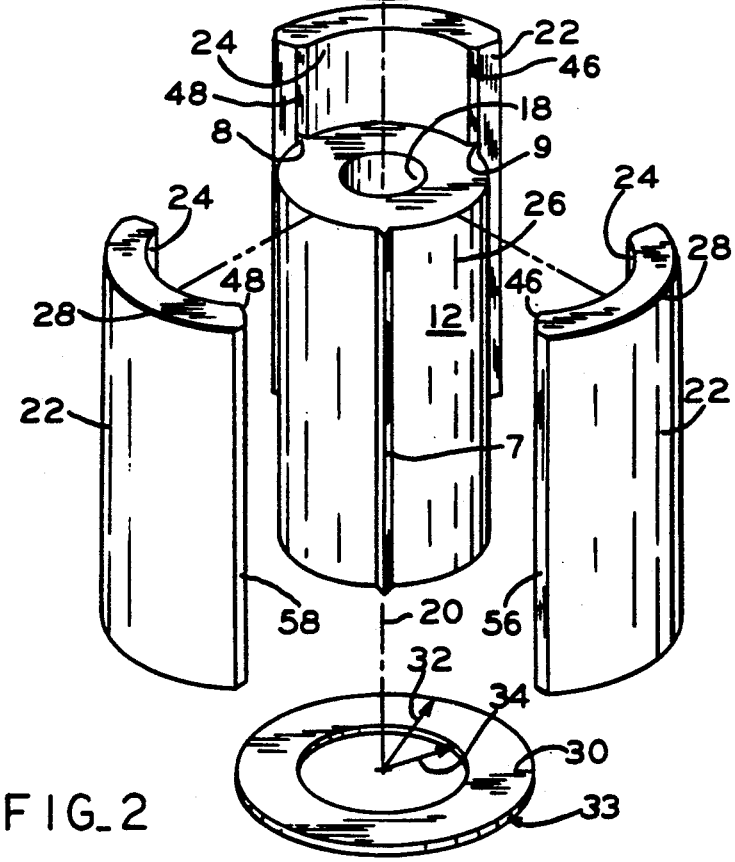
FIG_2

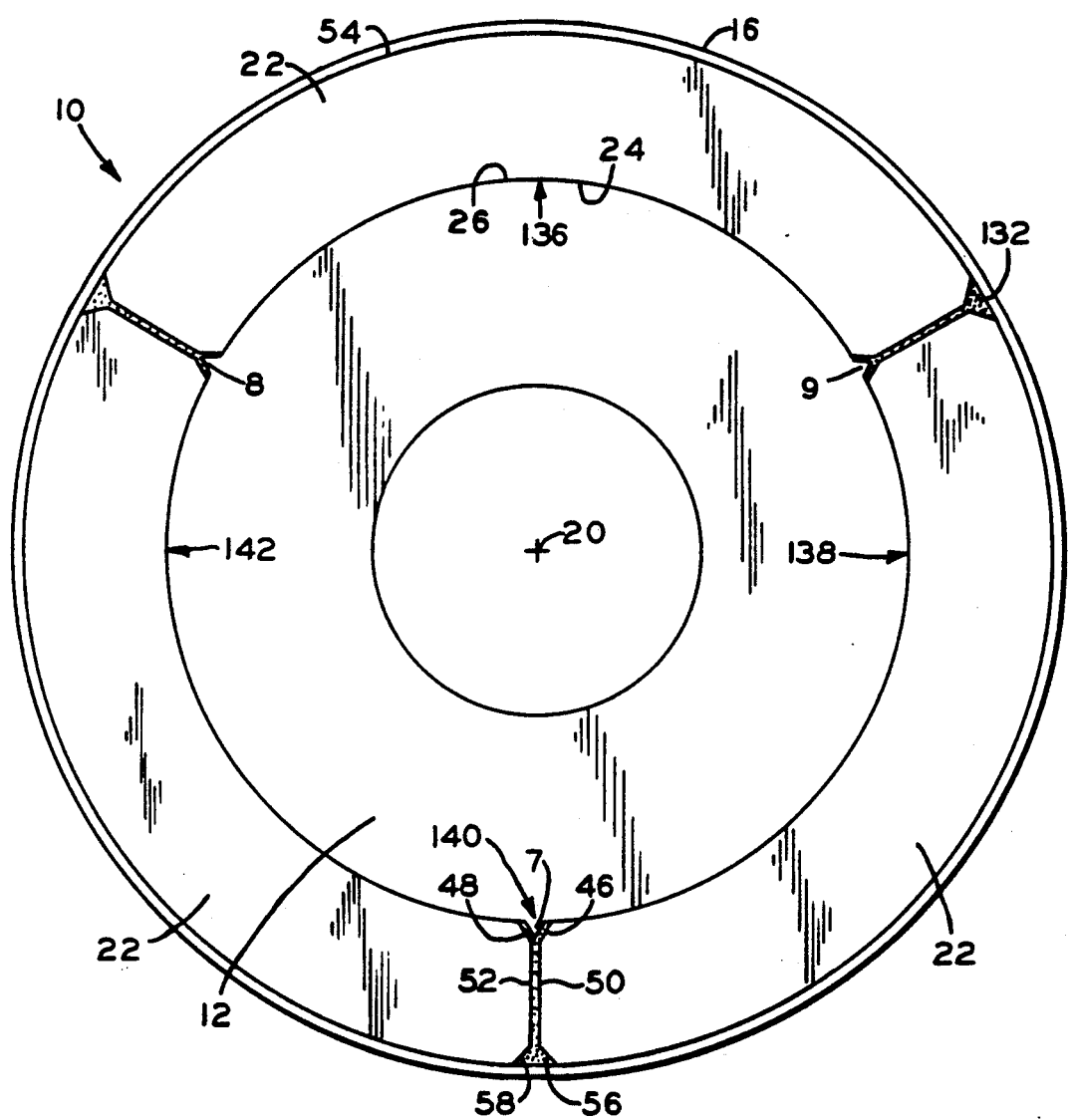
FIG_4

PERMANENT MAGNET ROTOR HAVING MAGNET POSITIONING AND RETAINING MEANS

BACKGROUND OF THE INVENTION

This is a continuation-in-part from pending application Ser. No. 459,633, filed Jan. 2, 1990, now U.S. Pat. No. 5,040,286, which is a continuation-in-part from Ser. No. 203,942, filed June 8, 1988, abandoned.

The present invention relates generally to permanent magnet rotors, and more particularly to novel techniques for retaining a core and a plurality of magnetic elements in assembled relation.

Permanent magnet rotors for dynamoelecric machines, such as electronically commutated motors (ECMs), typically are constructed of a generally cylindrical iron core, which may be of a solid or sintered metal construction or may be a laminated core, and around which are positioned a plurality of magnetizable elements. The magnetizable elements are arcuate shaped with an inner contour conforming to the outer surface of the core such that the magnets may be adhered to the core by an adhesive layer. The magnetizable elements are generally made from barium or strontium ferrite, or samarium cobalt (rare earth). Permanent magnet rotors of this general type find particular application in motors having control circuitry which controls energization of the windings in one or more predetermined sequences to provide rotational magnetic fields and thereby rotation of the rotor. Numerous patents disclosing such rotor applications are identified in copending U.S. patent application Ser. No. 459,633, filed January 2, 1990, entitled "Permanent Magnet Rotor and Method and Apparatus for Making Same", which is assigned to the assignee of the present invention and incorporated herein by reference.

The relative high mass of the materials used to form the magnetic elements and the relatively high rotor speeds, generally in the order of 1000-16,000 RPM, create significant forces during rotor operation, including centrifugal forces and substantial momentum forces upon sudden reversals of rotor rotation. Retention of the magnets in predetermined rotational positions about the core is critical to optimum motor operation. A number of methods and techniques for retaining magnets in fixed relation on the rotor core have previously been considered. One such technique involves positioning the magnetic elements around the core and applying a Kelvar or fiberglass wrap to hold the magnets in place. In this technique, an adhesive filler may be employed to fill voids and provide a more rigid structure, thereby further preventing magnet movement about the core during motor operation.

Another technique for retaining magnets on an associated core in a permanent magnet rotor includes wrapping a relatively fine wire, under tension, around the magnetic elements followed by an adhesive or epoxy coating to protect the wire and "pot" the assembly. Another technique employs a cylindrically shaped shell or "can" which is assembled around the outer peripheral surfaces of the magnets. The various prior methods and techniques for retaining magnets in fixed rotational position on associated cores in permanent magnet rotors are described in greater detail in the aforementioned copending U.S. patent application Ser. No. 459,633.

Still another technique provides machined or cast pockets on the rotor core to receive and retain the magnets in fixed rotational relation on the rotor. See, for example, U.S. Pat. Nos. 4,549,341 (Kasabian) dated Oct. 29, 1985; No. 4,617,726 (Denk) dated Oct. 21, 1986; and No. 4,625,135 (Kasabian) dated Nov. 25, 1986. Other techniques for retaining magnets in fixed relation on rotor cores include providing mutually engaging flat surfaces on the cores and magnets as disclosed in U.S. Pat. No. 4,656,379 (McCarty) dated Apr. 7, 1987; No. 4,631,435 (McCarty) dated Dec. 23, 1986; and No. 4,633,113 (Patel) dated Dec. 30, 1986. Yet another technique employs wedge shaped magnets which are retained in relatively complex pockets or slots formed in the rotor as exemplified by U.S. Pats. No. 4,332,079 (Silver) dated June 1, 1982; No. 4,339,874 (McCarty) dated July 20, 1982; and No. 4,336,649 (Glaser) dated June 29, 1982.

Other techniques which have been employed to secure magnets to rotors include the use of adhesives, such as disclosed in U.S. Pat. No. 3,531,670 (Loudon) dated Sept. 29, 1970; and the use of a cast aluminum core as disclosed in U.S. Pat. No. 4,088,177 (Armstrong et al.) dated May 9, 1978.

While many of the approaches to retaining magnets on rotor cores exemplified by the aforementioned patents have been found satisfactory for their intended applications, many exhibit drawbacks such as difficulty in manufacture and/or assembly, or failure to adequately retain the magnets in fixed rotational position on the rotors during high speed operation and when subjected to repeated starting, stopping and reversal of the motor in which the rotor is used.

Still another technique for preventing slippage of magnets relative to their cores in permanent magnet rotors is to provide spacers or projections on the exterior of the core between adjacent magnets as disclosed in U.S. Pat. No. 4,742,259 (Schaefer). However, with this technique, the magnets may be forced against the projections under operational stress so that flaking or breakage of the magnets may result, primarily at the sharp corner edges of the magnets adjacent the core. This problem may be more serious with molded or ceramic magnets which tend to chip with the possibility of magnet particles escaping into other parts of the motor and causing damage or even failure of the motor during operation.

SUMMARY OF THE INVENTION

One of the primary objects of the present invention is to provide a permanent magnet rotor assembly having improved means to prevent slippage of the magnets relative to the rotor during high speed operation.

Another object of the present invention is to provide a permanent magnet rotor having improved means to maintain substantially equal spacing between adjacent magnets after assembly of the rotor.

Another object of the invention is to provide a permanent magnet rotor wherein the core is provided with a plurality of radially extending ribs or tabs which extend between adjacent edges of arcuate magnets secured about the core, and wherein a curable adhesive is introduced into any spaces existent between the magnets and tabs so that the cured adhesive and tabs cooperate to prevent relative rotation between the magnets and core during operation.

Yet another object of the present invention is to provide a rotor structure which is extremely durable, easy to manufacture and relatively inexpensive.

In carrying out the various objects of the present invention, a permanent magnet rotor is provided which includes a substantially cylindrical core having equally circumferentially spaced ribs or tabs extending radially outwardly from the external cylindrical surface. The ribs or tabs are configured and positioned such that each rib projects between adjacent chamfered edges of a pair of magnets. A curable adhesive is introduced into the space between each rib and the adjacent magnets so that the hardened adhesive creates a wedge to lock the magnets firmly in place and prevents slippage during rotation of the rotor. One embodiment utilizes a core constructed from punched laminations or powdered metal material and has an outer cylindrical shell or sleeve which retains the magnets against the periphery of the core. End plates are retained against the ends of the core and the magnets. The end plates may be slidable over the rotor core and include a chamfered periphery in the order of 30 degrees such that the outer shell may be bent a corresponding angle to grip the chamfered peripheral edges of the end plates.

BRIEF DESCRIPTION OF THE DRAWINGS

FIG. 1 is a perspective view of a permanent magnet rotor constructed in accordance with one embodiment of the present invention;

FIG. 2 is an exploded view of the rotor of FIG. 1 prior to assembly;

FIG. 4 is an end view similar to FIG. 3 but illustrating the core ribs in cooperating relation with three magnets surrounding the core;

FIG. 10 is a fragmentary sectional view illustrating the manner of bending the ends the outer shell over the chamfered outer peripheral edges of the end plates.

DETAILED DESCRIPTION

Figure 3:
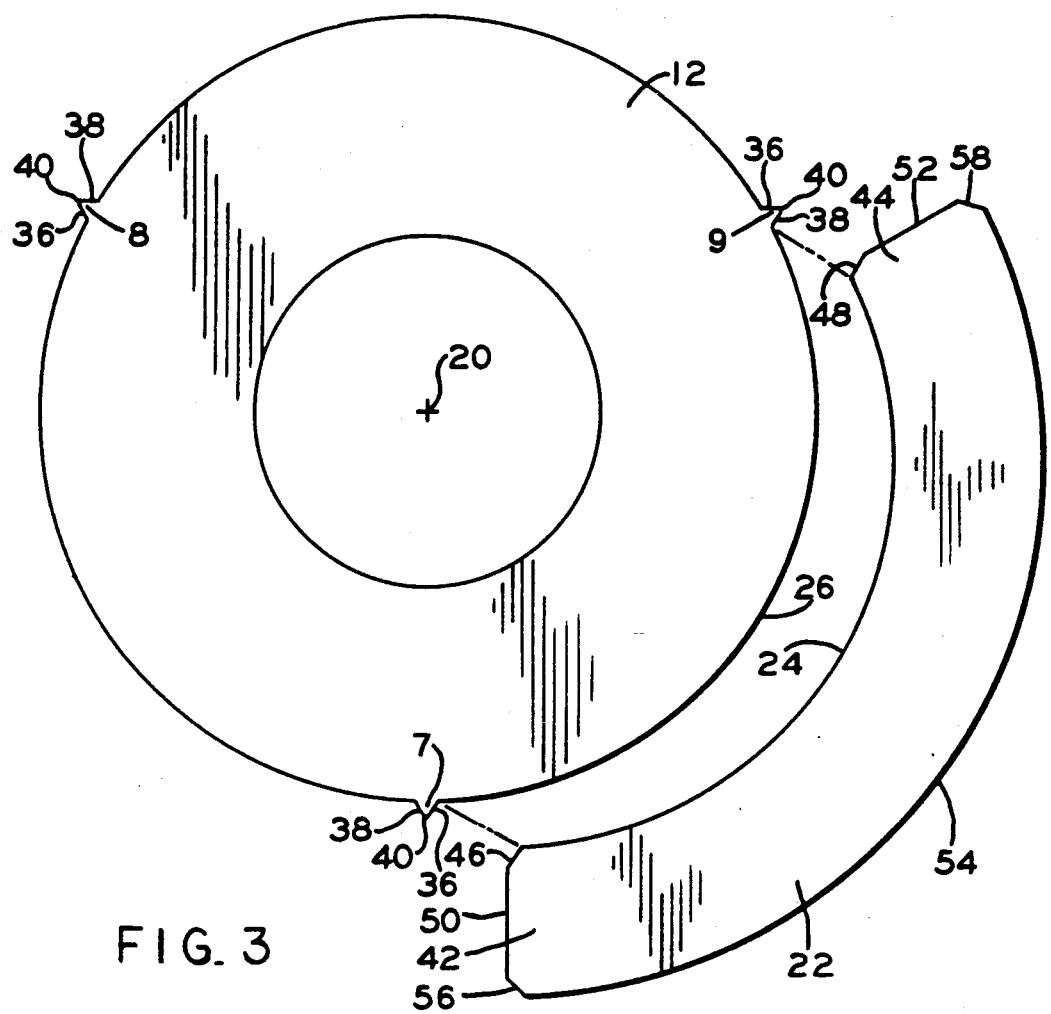
FIG. 3 is an end view, on an enlarged scale, illustrating the manner in which the core ribs cooperate with chamfered edge surfaces formed on the magnets in accordance with the present invention.

Referring now to the drawings, a permanent magnet rotor constructed in accordance with the present invention is indicated generally at 10. The rotor includes a rotor core 12, a pair of identical end plates, one of which is indicated at 14, and an outer sleeve or shell 16. FIG. 2 illustrates in exploded view the core 12 as a solid powdered metal generally cylindrically shaped core having a longitudinal cylindrical bore extending through the core coaxial with a central axis 20. A plurality of tabs or ribs, indicated at 7, 8 and 9, are formed in equidistant circumferentially spaced relation about the core and project radially outwardly and axially along an outer surface 26 of the core. The core 12 may alternatively be formed as a solid powdered metal core or a laminated core depending upon the particular application in which the rotor will be used.

A plurality of similarly configured arcuate magnetic elements 22, of which there are three in the illustrated embodiment, are adapted to snugly engage the outer core surface 26 between the tabs or ribs 7, 8 and 9. The magnetic elements 22 may comprise ceramic magnets and may, at the time of assembly with the core 12, be in a magnetized or magnetizable condition. Each magnetic element 22 has an arcuate inner surface 24 having a radius of curvature approximately equal to the radius of curvature of outer surface 26 of the core.

The end plates include the top end plate 14 and a bottom end plate 30. The end plates 14 and 30 may comprise aluminum rings or washers having an outer radius 32 and an inner radius 34. In the embodiment illustrated in FIG. 2, the outer radius 32 is equal to or slightly less than the overall combined radius of core 12 and magnetic elements 22 when assembled, while inner radius 34 is larger than the radius of bore 18 in core 12 and smaller than the radius of the cylindrical core surface 26. The end plates 14 and 30 prevent pieces of ceramic magnet material from contaminating the interior of the motor in the vent the magnetic elements crack or chip during assembly, handling or high speed rotor rotation. As will be described, the end plates cooperate with the outer shell 16 to enclose the magnetic elements 22. In certain motor applications, the end plates may be omitted.

The outer shell or sleeve 16 is preferably made of a non-magnetic metal such as stainless steel. The selection, fabrication, and assembly of the outer shell around the magnets 22 and core 12, and the crimping of the opposite ends of the outer shell radially inwardly over the outer peripheral edges of the end platers 14 and 30 is described in detail in the aforenoted pending application Ser. No. 459,633, filed Jan. 2, 1990.

Figure 5:
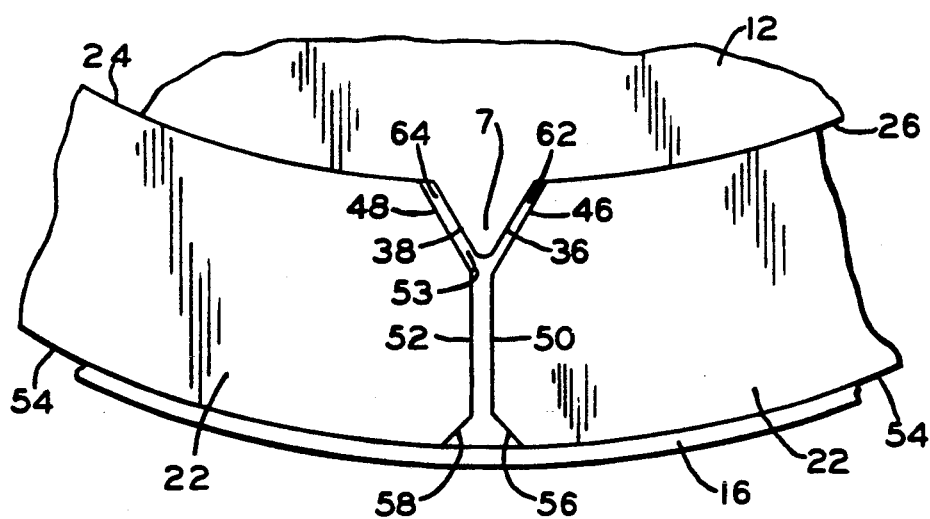
FIG. 5 is a fragmentary end view, on an enlarged scale, illustrating a portion of the core and one of the core ribs in spaced relation with adjacent magnets retained against the core by an outer shell and prior to introducing hardenable adhesive into the cavities.
Figure 7:
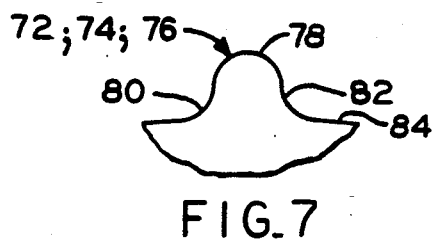
FIG. 7 is an enlarged fragmentary detail view of a rib portion of the rotor of FIG. 6.

Referring to FIGS. 3-5, taken in conjunction with FIG. 2, the rotor core 12 includes three ribs or tabs 7, 8 and 9 spaced arcuately 120 degrees apart about the outer cylindrical surface 26 of the rotor core. The ribs 7, 8 and 9 spaced arcuately 120 degrees apart about the outer cylindrical surface 26 of the rotor core. The ribs 7, 8 and 9 are triangular in transverse cross section with generally planar side surfaces 36 and 38 converging or inclined inwardly toward each other as they extend outwardly from the core 12 so as to terminate in a generally rounded outer edge. While the ribs 7, 8 and 9 are shown in FIG. 2 as extending longitudinally along the full length of the outer surface of rotor core 12, the ribs may be formed along only a portion of the core length or may be intermittent. It is desirable that each rib extend along a substantial portion of the core length.

Referring to FIG. 3, the magnetic elements 22 each have an arcuate dimension slightly less than 120 degrees and define opposite longitudinal ends 42 and 44. The inner opposed corners or marginal edges of adjacent mutually facing ends 42, 44 of the magnets 22 are chamfered or beveled to create inclined chamfer surfaces 46 and 48 which define a generally triangular cavity or chamber between the mutually facing marginal edges of each adjacent pair of magnets. The chamfer surfaces 46 and 48 are preferably formed to lie substantially parallel to the planar side surfaces 36 and 38 of the corresponding ribs 7, 8 and 9. The longitudinal ends 42 and 44 of the magnetic elements 22 have planar radial side surfaces 50 and 52 which terminate at their radial outer edges in chamfer or beveled edge surfaces 56 and 58.

The chamfered corner edge surfaces 56 and 58 are preferably formed to prevent sharp outer corner edges on the ceramic magnet elements 22 and thereby minimize breakage or chipping of the magnets.

FIG. 4 illustrates in transverse section an assembled rotor 10 wherein the three arcuate magnetic elements 22 are positioned about rotor core 12 with their inner surfaces 24 engaging the outer surface 26 of the rotor core 12 between the ribs or tabs 7, 8 and 9. It is important to maintain substantially equal angular spacing between adjacent magnetic elements to achieve a balanced rotor construction. In certain motor applications, the magnetic elements 22 may be held in place by an adhesive coating between the outer surface 26 of the core and the mating inner surfaces 24 of the magnetic elements.

As illustrated in FIG. 4, the arcuate lengths or dimensions of the magnetic elements 22 are such that are established between the opposing longitudinal side surfaces 50 and 52 of the magnetic elements, and between the corresponding chamfer surfaces 46, 48 and the opposed surfaces 36, 38 on the corresponding ribs or tabs 7, 8 and 9, such as indicated at 62 and 64 in FIG. 5. In this manner, a cavity is created between each rib or tab 7, 8 and 9 and the adjacent magnetic elements, the extent or size of each such cavity being dependent upon the dimensional tolerance range of the magnetic elements and the core and corresponding ribs or tabs.

In certain applications, the magnetic elements 22 may be retained in assembled relation on the core 12 by applying a Kelvar or fiberglass wrap about the magnetic elements, or by fine wire under tension with an adhesive filler. In the preferred embodiment illustrated in FIGS. 1, 2 and 4, an outer thin steel shell 16 is applied around the core 12 and surrounding magnetic elements 22, either by a heat-shrink technique or preferably through a cold-pressing technique as described in the aforementioned pending patent application Ser. No. 459,633 so as to maintain the magnetic elements in fixed longitudinal relation on the core. After applying the shell 16 over the core and magnetic elements, the opposite ends of the shell 16 may be crimped or rolled radially inwardly over the outer edges of the end plates 14 and 30 so as to retain them against the opposite ends of the core and establish a substantially sealed rotor. Alternatively, an adhesive or other suitable means may be used to hold the end plates in place. The outer shell 16 thus serves to retain the core, magnetic elements and end plates in assembled relation, while the previously applied adhesives cure and harden.

In accordance with one feature of the invention, prior to assembling the shell 16 over the magnetic elements and core, the adhesive, such as epoxy, applied to the outer cylindrical surface 26 of the core, is also introduced into the spatial cavity 62, 64 between each of the ribs or tabs 7, 8 and 9 and the corresponding chamfered edge surfaces of the magnetic elements. The adhesive, or other hardenable viscous material, when cured and hardened after applying the shell 16, locks into the ribs or tabs and cooperates with the ribs and magnetic elements to lock the magnetic elements in fixed rotational relation on the core so as to prevent relative rotational movement between the magnetic elements and the core. The adhesive or hardenable viscous material introduced into the spaces 62 and 64 is also into introduced and fills the radius spaces or gaps between the opposed longitudinal radial surfaces 50 and 52 of the magnetic elements, such as indicated at 66 in FIG. 4, to assist in maintaining the magnet elements in equal angularly spaced relation.

With the rotor core 12 thus described, it will be appreciated that a substantially cylindrical rotor core is provided having an axis of rotation 20 and a radius of curvature defined by the substantially cylindrical surface 26 on the rotor core. The magnetizable elements 22 have inner surfaces 24 of substantially equal radius to the radius of curvature of the surface 26 of the rotor core 12, and have outer surfaces 54 concentric with the corresponding inner surfaces 24. Each magnetizable element 22 is defined along its longitudinal marginal edges by the associated radial side surfaces 50 and 52 and corresponding chamfered edge surfaces 46,56 and 48,58. With the inner arcuate surfaces 24 of the magnetic elements 22 being placed against the outer surface 26 of the core 12 after application of a hardenable adhesive to the surface of the core, and with each adjacent pair of magnetic elements having their inner chamfered longitudinal edge surfaces 46 and 48 spaced from the opposed side surfaces 36 and 38, respectively, on the ribs 7, 8 and 9, cavities are formed between the chamfered edge surfaces 46 and 48 on the magnetic elements and the corresponding ribs, as well as between the mutually opposed and spaced longitudinal side surfaces 60 and 52 on adjacent pairs of magnetic elements. Hardenable adhesive introduced into these cavities, when cured, cooperates with the ribs and magnetic elements to lock the magnetic elements circumferentially on the core 12. With the outer shell 16 assembled over the magnetic elements 22, any tendency of the magnetic elements to move circumferentially relative to the core is resisted by the ribs and hardened adhesive. Further, any tendency of the chamfered edges 46 and 48 on the magnetic elements to ride up the inclined surfaces 36 or 38 on the adjacent ribs during high speed rotation of the rotor, or when subjected to substantial momentum forces during starting, is resisted by the outer shell 16 preventing radial outward movement of the magnetic elements. Thus, the longitudinal ribs on the rotor, the chamfered edge surfaces on the magnetic elements, the hardened adhesive between the ribs and opposing chamfered edge surfaces, and the outer shell 16 cooperate to prevent circumferential movement of the magnetic elements relative to the rotor core.

Figure 6:
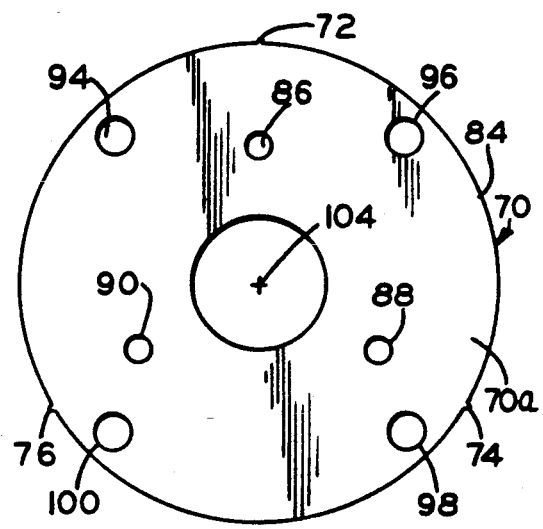
FIG. 6 is an end view of a core having rotor ribs of an alternative design.

FIG. 6 is a plan or end view of an alternative rotor core, indicated generally at 70, which comprises a laminated core. In the illustrated embodiment, each lamination is similar to the end lamination 70a and is made from sheet metal such as 0.018-0.0125 inch thick annealed silicon steel. Each lamination may be formed by a stamping or punching operation and has circular positioning holes 86, 88 and 90, and circular fastening holes 94, 96, 98 and 100 formed therethrough, preferably by punching at the time the lamination is stamped from sheet metal. The angular positioning holes 86, 88 and 90 are aligned between the center axis 104 of the lamination and the centers of radial ribs or tabs 72, 74 and 76 which are formed in equidistant circumferentially spaced relation about the axis 104. That is, a radial line drawn from the center 104 of the lamination 70a to the center or apex of rib 72 will pass through the center of positioning hole 86. Similarly, positioning hole 88 is radially aligned with the center of rib 74, and positioning hole 90 is radially aligned with the center of rib 76.

Referring particularly to FIG. 6, the three ribs or tabs 72, 74 and 76 on the lamination 70a are formed as integral rounded tabs with each tab having a uniformly rounder outer end surface 78 and rounded fillets 80 and 82 which merge the rounded outer end to a circular edge surface 84 of the lamination. If desired, the laminations may be formed with less than three radial tabs and assembled so as to longitudinally align at least several tabs of the lamination stack along each 120° tab location, it being only necessary that the various holes 86, 88, 90, 94, 96, 98 and 100 also be aligned with each other and the final lamination assembly be in balance. Thus, the positions of the angular positioning holes such as 88 and 90 are fixed relative to the tabs or ribs 74 and 76, respectively. While the angular positioning holes, such as 88 and 90, and the tabs or ribs, such as 74 and 76, need not be radially aligned, it is desirable that their relative positions be predetermined and fixed. By selectively rotating the laminations during stacking it is possible to compensate for the differences in thickness using three fastening holes in a three-rib rotor. By having the ratio of tabs or ribs to positioning holes equal a whole number, selective positioning of the tabs or ribs may also be accomplished to create intermittent longitudinally aligned ribs along the core length.

Figure 8:
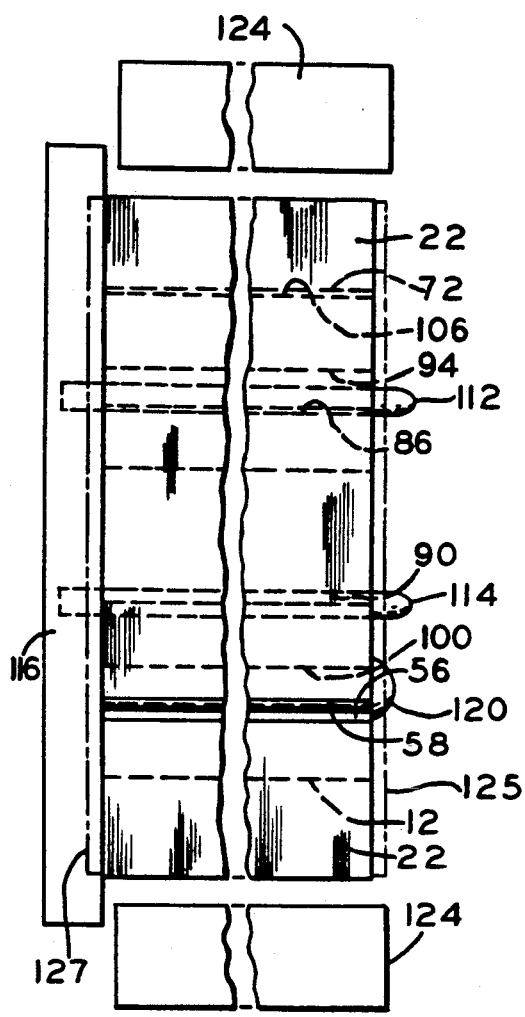
FIG. 8 illustrates apparatus one method of fabricating and magnetizing laminated rotor assemblies in accordance with the invention.

FIG. 8 illustrates an assembly fixture for assembling the laminated core 70 wherein laminations, such as 70a, may be stacked on positioning posts 112 and 114 which extend from a fixture plate 116. When the desired stack height or thickness of laminations is obtained, the laminations are fastened together by suitable fastening means such as rivets 120 through the fastening holes 94, 96, 98 and 100. While four fastening holes 94, 96, 98 and 100 are employed in each lamination, fewer fastening holes may be provided. For example, where the individual laminations may have greater thickness on one side or edge than another, as a result of the rolling process used to roll the sheet metal to desired nominal thickness prior to stamping or punching the laminations, it may be desirable to form three fastening holes in each lamination such that the centers of the holes lie on a common circle in equal angular spacing about the center axis.

As in the aforedescribed rotor assembly 10 employing core 12 and magnetic elements 22, when utilizing the laminated core 70 in a rotor, adhesive such as epoxy or suitable thermoplastic material such as nylon or valox is applied on the outer surface 84 of the laminations and also on the tabs or ribs 72, 74 and 76. Three arcuate magnets 22 are then positioned and temporarily retained against the core 70 between the ribs or tabs 72, 74 and 76. Sufficient thermoplastic or hardenable adhesive is applied to the ribs and between the spaced longitudinal edges of the adjacent magnetic elements 22 to fill the spaces or voids. A cylindrical shell or sleeve, such as 16, is then assembled over the magnetic elements and core to prevent movement and, in most cases, rotation of the magnetic elements relative to the core. When hardened, the adhesive or other viscous hardenable material previously introduced into the spaces adjacent the ribs or tabs cooperates with the magnetic elements and ribs to lock the magnetic elements in fixed relation on the core and prevent relative rotation therebetween. The rotor is subsequently magnetized.

Figure 9:
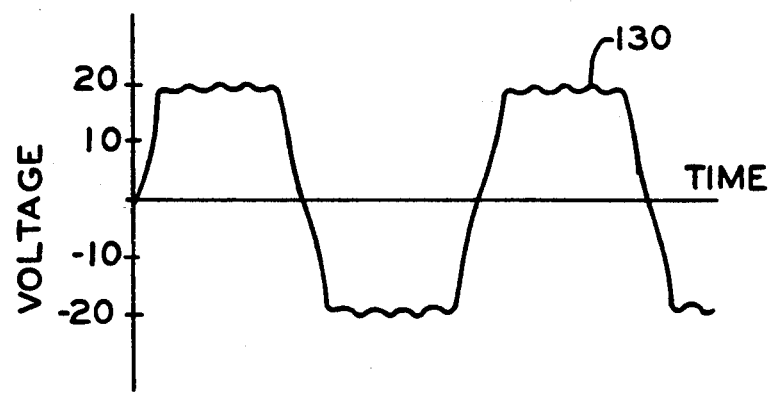
FIG. 9 is a graph depicting the phase voltage across a motor incorporating the rotor of FIGS. 1-7.

As illustrated in FIG. 8, the fixture plate 116 is positioned within magnetizing means, such as a coil 124, which is operative to establish a strong magnetic field to magnetize the magnets 22 and establish north and south polarity positions of the magnets 22, such as indicated at 136, 138, 140 and 152 in FIG. 4. A completed rotor having more poles than magnetic was found to exhibit voltage ripples such as those shown in FIG. 9. FIG. 9 schematically illustrates an open circuit voltage across one phase of a motor with the motor rotating. It is seen that the phase voltage 130 includes a plurality of voltage ripples which result, at least in part, from the rotor rotating the gaps between adjacent magnets 22 past the stator windings. This ripple and the shape of the waveforms of phase voltage 130 will change if the poles of the rotor are positioned differently relative to the breaks or gaps between adjacent magnets. In order to obtain uniformity of magnetization and voltage ripples, the breaks or spacing gaps between magnets 22 are always positioned the same within the magnetizing means 124 through use of the angular positioning holes 86, 88 and 90. The magnets 22 are angularly positioned so that one or more positioning posts such as 112 and 114 extend through one or more of the angular positioning holes 86, 88 and 90, to ensure that the magnets 22 are consistently positioned within the magnetizing means 124 with the breaks or magnetic discontinuities between magnets in the same angular position. This provides uniform polarity with uniform magnetization and uniform voltage ripples due to the magnetic discontinuities. This uniformity is desirable in the electronic circuitry used with electronically commutated motors, for example, facilitating direct substitution, and/or interchangeability of rotors.

In another embodiment of a permanent magnet rotor in accordance with the invention, the inner radius 34 of one or both of the end plates 14 and 30 is made larger than the radius of curvature of the core surface 26 plus the radial dimension of the ribs or tabs 7, 8 and 9 so that the end plates can slide over the core 12 and associated tabs or ribs. However, with such an arrangement, crimping or bending the ends of the outer shell 16 over the end plates 14 and 30 to form a substantially right angle bend may not be desirable because the end plates may be forced against the ends of the magnetic elements 22. This may be avoided by bending the end of the outer shell 16 over the end plates 14 and 30 at an acute angle in the order of 30 degrees. This is facilitated by providing chamfered or angularly inclined outer periphery edges on the end plates 14 and 30. The angle of the chamfered edge relative to the axis of the corresponding end plate is preferably in the order of 30 degrees. The end plates are then positioned against the opposite ends of the magnetic elements such that the side surfaces of greater diameter abut the magnet ends. The opposite ends of a shell 16 are then formed inwardly, after assembly of the shell over the magnets, to firmly grip the chamfered peripheral edges of the end plates 14 and 30 and firmly retain them in assembled relation with the magnetic elements.

In a further alternate embodiment of the present invention, the end plates 14 and 30 are directly secured to the ends of a stacked lamination type core 70. Referring to FIG. 8, in forming such a core, the outermost end laminations of the stack constitute the annular end plates 14 and 30, as shown by dotted lines 125 and 127, respectively, in FIG. 8. The end plates 14 and 30 thus overlie the ends of the laminated core and all, or substantially all, of the ends of the magnetic elements 22 when positioned about the laminated core 70. Suitable fastening means, such as rivets 120, are then passed through holes in the end plates 14 and 30 which are aligned with the fastening holes 94, 96, 98, and 100 such that the rivets 120 securely fasten the end plates to the laminated core with the end plates also extending over the ends of the magnetic elements 22 to prevent their axial movement. An adhesive, such as epoxy or other suitable thermoplastic material, may be applied between the end plates 14 and 30 and the ends of the magnetic elements 22. The outer shell 16, when subsequently applied around the rotor assembly, need not be bent around, or over, the end plates 14 and 30 to retain the end plates in place. To avoid any possible interference in sliding the outer shell 16 over the rotor and magnetic elements 22, the end plates 14 and 30 are preferably made slightly smaller in diameter than the outer diameter of the arcuate magnetic elements when placed on the rotor core 12.

From the foregoing description, it can be seen that the permanent magnet rotor 10 of the present invention provides improved cooperation between the core and magnetic elements in a manner to maintain substantially equal arcuate spacing between adjacent magnetic elements, and also prevents rotational slippage of the magnetic elements relative to the core during high speed rotation of the rotor. This results in a rotor which is extremely durable and relatively easy to manufacture.

While the present invention has been described with respect to certain preferred embodiments thereof, it is to be understood that changes and modifications in the various details of construction, the arrangement and combination of parts, and the types of materials employed may be made without departing from the spirit and scope of the invention.

For example, the rotor core may be machined from solid metal, with the tabs or ribs formed integral with the otherwise cylindrical core body. Also, the tabs or ribs may be formed on the core by laying down weld material through a MIG (metal inert gas) welding process longitudinally along the outer surface of the rotor. The weld material may then be machined to obtain the desired rib size and configuration. It has been found that for some applications, construction of the core from punched laminations is desirable, while the use of a powdered metal rotor core molded to the desired configuration may be preferred in other applications. In the use of a laminated core, it is not necessary for all laminations to include radial ribs or tabs. For example, only one or two ribs may be formed on each lamination and the laminations selectively rotated such that the one or two ribs are positioned sequentially in different angular positions such as, in a three magnet rotor, 120 degrees apart. Alternatively, it is not necessary for every lamination to include such radial ribs or tabs. Every second or third lamination might include radial ribs or tabs while the other laminations could be of circular configuration.

What is claimed is:

1. A permanent magnet rotor assembly comprising:
a substantially cylindrical rotor core having an axis of rotation, said core having a plurality of ribs extending generally radially outwardly from an outer cylindrical surface of said core and extending longitudinally along said outer surface, said ribs being spaced equidistantly about said rotor core and having longitudinally side surfaces which taper toward each other in the outward direction of said ribs;
a plurality of substantially identical arcuate magnetic elements each of which has substantially equal radial thickness and is bounded by concentric inner and outer arcuate surfaces and longitudinal side surfaces;
annular retainer means disposed about and retaining said magnetic elements firmly against said outer surface of said core with each magnetic element being positioned between a pair of ribs, said ribs each extending radially from said rotor core a distance substantially less than said radial thickness of said magnetic elements, said magnetic elements having arcuate tolerance ranges such that the longitudinal side surfaces of adjacent magnetic elements lie in spaced-apart planes and establish generally radial cavities between adjacent magnetic elements, said magnetic elements being positioned on said core so that said radial cavities are of substantially equal arcuate dimension, said magnetic elements having inner chamfered longitudinal edge surfaces disposed in opposed spaced relation to the tapered side surfaces of adjacent ribs to create cavities between said chamfered surfaces and said ribs which communicate with the corresponding radial cavities; and
a hardened viscous adhesive material between said core and said magnetic elements and substantially filling said cavities between said chamfered surfaces and said ribs and said radial cavities between adjacent magnetic elements;
said hardened viscous material cooperating with said retainer means, ribs and magnetic elements to maintain said magnetic elements in substantially equal spaced relation and prevent circumferential movement between said magnetic elements and said core during rotation of the rotor assembly.

2. A permanent magnet rotor in accordance with claim 1 wherein the arcuate length of said inner surfaces of said magnetic elements is slightly less than the arcuate length of the surface of said rotor core between each pair of adjacent ribs.

3. A permanent magnet rotor in accordance with claim 1 said retaining means comprises an outer shell disposed around said magnetic elements and said rotor core for retaining said magnetic elements and rotor core in fixed radial relation during rotation thereof.

4. A permanent magnet rotor in accordance with claim 3 wherein said outer shell comprises a non-magnetic stainless steel tubular shell.

5. A permanent magnet rotor in accordance with claim 3 wherein at least one end plate is secured to an end of said rotor core so as to overlie ends of said magnetic elements and at least a portion of said rotor core and said cavities adjacent said ribs.

6. A permanent magnet rotor in accordance with claim 5 wherein said rotor core extends axially a distance greater than the axial length of said magnetic members such that said at least one end plate may be secured directly to said rotor core without engaging said magnetic elements.

7. A permanent magnet rotor assembly in accordance with claim 5 wherein said at least one end plate is aluminum.

8. A permanent magnet rotor in accordance with claim 5, wherein said at least one end plate is in the form of a ring and includes a central aperture.

9. A permanent magnet rotor in accordance with claim 5 wherein an end plate is positioned against each end of said rotor core, and wherein the ends of said outer shell are formed over the end plates to retain said plates in position against said magnetic elements and rotor core.

10. A permanent magnet rotor assembly comprising:
a substantially cylindrical rotor core having an axis of rotation and an outer radius of curvature;

a plurality of arcuate magnetic elements each of which has a radial thickness bounded by an inner surface having a radius of curvature substantially equal to the radius of curvature of said rotor core, an outer surface substantially concentric to said inner surface, and longitudinal side surfaces;

a plurality of ribs on said rotor core extending radially outwardly a distance substantially less than the radial thickness of said magnetic elements, said ribs being equal in number to said magnetic elements and being substantially equally circumferentially spaced about said rotor core and extending substantially parallel to said axis of rotation, said ribs having longitudinal side surface which converge toward each other in the radial direction from said core, annular sheet means disposed about and securing said magnetic elements on said rotor core between said ribs, said magnetic elements having arcuate tolerance ranges which create radial cavities between said longitudinal side surfaces on said magnetic elements, said magnetic elements having inner longitudinal edge surfaces configured to form cavities between said edge surfaces and said converging side surfaces on said ribs which communicate with said radial cavities, said magnetic elements being positioned to establish substantially equal radial cavities between said magnetic elements; and a hardenable adhesive material substantially filling said radial cavities and said cavities between said magnetic elements and said ribs;

said ribs and hardenable material being cooperative with said shell means to maintain said magnetic elements in fixed equally spaced relation on said rotor core and prevent circumferential movement of said magnetic elements relative to the rotor core during rotation of the rotor assembly.

11. A permanent magnet rotor in accordance with claim 10 wherein the outer surfaces of said magnetic elements are chamfered to avoid a sharp intersection between said outer surfaces and said longitudinal side surfaces of said magnetic elements.

12. A permanent magnet rotor in accordance with claim 10 wherein said magnetic elements form a substantially cylindrical assembly when mounted on said rotor core.

13. A permanent magnet rotor in accordance with claim 12 wherein said magnetic elements are formed of a ceramic material.

14. A permanent magnet rotor assembly in accordance with claim 10 wherein said longitudinal side surfaces on said ribs comprise generally planar sides which taper toward one another as they extend outwardly from the outer surface of said rotor core.

15. A permanent magnet rotor in accordance with claim 14 wherein said inner surfaces of said magnetic elements are defined by chamfered longitudinal edge surfaces disposed in substantially parallel spaced relation to the tapered side surfaces of said ribs so as to form said cavities.

16. A permanent magnet rotor in accordance with claim 10 wherein said rotor core extends axially a distance greater than the axial length of said magnetic elements, a pair of end plates are disposed against opposite ends of said rotor to overlie said magnetic elements and at least a portion of said rotor core including said ribs and said cavities, and said annular shell has end surfaces bent over the end plates to retain said end plates in position and encompass said magnetic elements by said annular shell and end plates.

17. A permanent magnet rotor in accordance with claim 16 wherein said end plates are in the form of rings each of which has a central aperture.

18. A permanent magnet rotor in accordance with claim 17 wherein said core is formed of a powdered metal.

19. A permanent magnet rotor in accordance with claim 18 wherein said annular shell is a non-magnetic stainless steel.

20. A permanent magnet rotor in accordance with claim 19 wherein said end plate are aluminum.

21. A permanent magnet rotor in accordance with claim 14 wherein the arcuate lengths of the inner surface of said magnetic elements are slightly less than the arcuate lengths of the surfaces of said rotor core between corresponding adjacent ribs on either side of said magnetic elements.

22. A permanent magnet rotor in accordance with claim 21 wherein said rotor core extends axially a distance greater than the axial length of said magnetic elements.

23. A permanent magnet rotor in accordance with claim 22 wherein at least one end plate is secured to an end of said rotor core and overlies said magnetic elements and at least a portion of said cover including said ribs and said cavities.

24. A permanent magnet rotor in accordance with claim 23 wherein said rotor core comprises a stack of laminations, and said at least one end plate is secured to said rotor core by one or more fasteners which extend through and secure said stack of laminations.

25. A permanent magnet rotor in accordance with claim 24 including an end plate secured to each end of said rotor core, and wherein said fasteners comprise rivets.

26. A permanent magnet rotor in accordance with claim 22 including, at least one end plate having a central aperture larger than the cross section of said rotor core such that said end is slidable over said rotor core toward said magnetic elements.

27. A permanent magnet rotor assembly comprising, in combination:

a substantially cylindrical core having an axis of rotation and an outer radius of curvature;

a plurality of magnetic elements each of which has an inner surface having a radius of curvature substantially equal to the radius of curvature of said core, an outer surface substantially concentric to said inner surface, and two longitudinal side surfaces connecting said inner and outer surfaces, said core having an axial length greater than the axial lengths of said magnetic elements;

a plurality of ribs on said core and extending radially outward a distance significantly less than the radial thickness of said magnetic elements, said ribs extending along the outer surface of said rotor core substantially parallel to said axis of rotation, said ribs having side surfaces which taper toward each other as they extend outwardly from said core;

said ribs being substantially equally spaced about said core substantially parallel to said axis of rotation, and equal in number to said magnetic elements;

said inner surface of each of said magnetic elements being positioned between and substantially filling the space between adjacent ribs, said magnetic elements being positioned to define substantially equal radial cavities between the longitudinal side surfaces of adjacent magnetic elements and having inner edge surfaces spaced from said tapered side surfaces on said ribs to define cavities therebetween communicating with the corresponding radial cavities, a hardenable adhesive material substantially filling said cavities, and at least one end plate having a central aperture larger than the cross section of said core such that said end plate is slidable over said core toward said magnetic elements, said at least one end plate having a chamfer along the outer periphery thereof, said chamfer being an acute angle with the periphery adjacent said magnetic elements being larger than the periphery remote from said magnetic elements, said ribs and adhesive material maintaining equal spacing of said magnetic elements and precluding deleterious movement of said magnetic elements relative to the core under high speed rotation of the rotor assembly.

28. A permanent magnet rotor in accordance with claim 27 including an outer annular shell disposed about said magnetic elements, said shell having an end surface bent over said periphery of said end plate an an acute angle to substantially match and grip said chamfer on the periphery of said end plate.

29. A permanent magnet rotor in accordance with claim 28 wherein said acute angle of said chamfer is in the order of 30 degrees.

30. A permanent magnet rotor assembly comprising:
a substantially cylindrical rotor core having an axis of rotation and an outer radius of curvature;
a plurality of magnetic elements of substantially equal radial thickness and each having an inner surface having a radius of curvature substantially equal to the radius of curvature of said rotor core, an outer surface substantially concentric to said inner surface, and two longitudinal side surfaces connecting said inner and outer surfaces;
a plurality of ribs extending radially outwardly from said rotor core a distance significantly less than the radial thickness of said magnetic elements, said ribs extending along a significant portion of the outer surface of said rotor core substantially parallel to said axis of rotation, said ribs having generally planar side surfaces converging toward each other in the direction outwardly from said core;
said inner surface of each magnetic element being positioned between and substantially filling the space between a corresponding pair of adjacent ribs, said magnetic elements having arcuate tolerance ranges which create radial cavities between said longitudinal side surfaces of said elements and having inner chamfered longitudinal edge surfaces disposed in spaced relation with the side surfaces of said elements and having inner chamfered longitudinal edge surfaces disposed in spaced relation with the side surfaces of corresponding ribs to define cavities therebetween which communicate with said radial cavities;
said magnetic elements being positioned on said core so as to establish substantially equal radial cavities between said elements;
a hardened viscous adhesive material interposed between said core and the inner surfaces of said magnetic elements and substantially filling each of said cavities; and
an outer shell axially positioned around and contacting said magnetic elements to press said magnetic elements toward said rotor core;
said hardened adhesive cooperating with said shell, said magnetic elements and said ribs to maintain said magnetic elements in fixed equally spaced relation on said core with said converging sides of said ribs and the chamfered edge surfaces of adjacent magnetic elements providing a reactive camming action wherein any attempted circumferential rotation of said magnetic elements relative to said rotor core is resisted by said ribs.

31. A permanent magnet rotor in accordance with claim 30 including a pair of end plates positioned against opposite ends of said rotor core and overlying corresponding ends of said magnetic elements and at least a portion of said rotor core including said ribs and said cavities.

32. A permanent magnet rotor in accordance with claim 31 wherein opposite ends of said outer shell are bent over said end plates to retain the end plates in position, said outer shell and end plates being cooperative to encompass said magnetic elements.

33. A permanent magnet rotor in accordance with claim 32 wherein said end plates comprise annular plates having central apertures.

34. A permanent magnet rotor in accordance with claim 50 wherein the outer surfaces of said magnetic elements are chamfered to avoid a sharp intersection between said outer surfaces and said longitudinal side surfaces of said magnetic elements.

35. A permanent magnet rotor comprising:
a substantially cylindrical rotor core having an axis of rotation and an outer radius of curvature;
a plurality of ribs spaced substantially equidistantly about said rotor core and extending along a substantial portion of the outer surface of said rotor core in parallel relation to said axis of rotation, said ribs having side surfaces which converge toward one another as they extend outwardly from said rotor core;
a plurality of magnetic elements each of which is positioned between a pair of said ribs and has an inner surface having a radius of curvature substantially equal to the outer radius of curvature of said rotor core, an outer surface substantially concentric to said inner surface, and longitudinal side surfaces, said magnetic elements being contoured to cooperate with said side surfaces of said ribs to form cavities therebetween;
an outer shell axially positioned over said magnetic elements and said rotor core to retain said magnetic elements radially against said rotor core;
a hardenable material disposed within said cavities between said magnetic elements and said ribs and being cooperative with said magnetic elements, said shell and said ribs to prevent circumferential movement of said magnetic elements relative to the rotor core during rotation of the rotor assembly;
said rotor core having a longitudinal length greater than the longitudinal lengths of said magnetic elements;
at least one end plate in the form of a ring having a central aperture and secured to an end of said rotor core and overlying said magnetic elements and at least a portion of said rotor core including said ribs and said cavities, said end plate having a chamfer about its outer periphery, said chamfer being an acute angle with the periphery of said ring adjacent said magnetic elements being larger in diameter than the outer periphery of said ring furthest from said magnetic elements;

said outer shell having an end surface bent over the chamfered periphery of said at least one plate so as to retain said end plate in position against said rotor core, whereby the corresponding ends of said magnetic elements are enclosed by said outer shell and said at least one end plate.

36. A permanent magnet rotor in accordance with claim 35 wherein the said end surface of said outer shell is bent over the end of the end plate at plates an acute angle to substantially match and grip the chamfer along the outer periphery of said at least one end plate.

37. A permanent magnet rotor in accordance with claim 36 wherein said acute angle of said at least one end plate and said acute angle of said chamfer are in the order of 30 degrees.

* * * * *